(12) United States Patent
Xu (10) Patent No.: US 8,244,731 B2
(45) Date of Patent: Aug. 14, 2012

(54) METHOD AND SYSTEM FOR DISPLAYING AND PROCESSING ELECTRONIC FILE LIST

(75) Inventor: Jiajian Xu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 89 days.

(21) Appl. No.: 12/868,858

(22) Filed: Aug. 26, 2010

(65) Prior Publication Data
US 2010/0325115 A1    Dec. 23, 2010

Related U.S. Application Data

(63) Continuation of application No. PCT/CN2009/071024, filed on Mar. 26, 2009.

(30) Foreign Application Priority Data

Mar. 26, 2008  (CN) .......................... 200810087770

(51) Int. Cl.
*G06F 17/30* (2006.01)
(52) U.S. Cl. ........................ 707/737; 707/723
(58) Field of Classification Search ................. 707/723, 707/737, 748–749, 752
See application file for complete search history.

(56) References Cited

U.S. PATENT DOCUMENTS

| | | | |
|---|---|---|---|
| 2006/0168044 A1* | 7/2006 | Chen et al. | 709/206 |
| 2007/0226204 A1* | 9/2007 | Feldman | 707/5 |

FOREIGN PATENT DOCUMENTS

| | | |
|---|---|---|
| CN | 1848108 A | 10/2006 |
| CN | 101103341 A | 1/2008 |
| CN | 101251837 A | 8/2008 |
| CN | 101488198 A | 7/2009 |

OTHER PUBLICATIONS

English-language translation of Chinese Office Action for Application No. 2008100877709.0, dated Oct. 23, 2009.

* cited by examiner

*Primary Examiner* — Thu-Nguyet Le
(74) *Attorney, Agent, or Firm* — Marshall, Gerstein & Borun LLP (57) ABSTRACT

An embodiment of the present invention provides a method and system for displaying and processing an electronic file list. The method includes: determining a keyword used for sorting in the electronic file list, retrieving keyword information of each electronic file in the electronic file list; and displaying the electronic file list in which electronic files are sorted.

18 Claims, 6 Drawing Sheets

| sender | ◇ | subject | 🔗 | date | ▽ |
|---|---|---|---|---|---|
| kevintan | ○ | Badminton training on Friday | ○ | 2008-3-24 (Monday)17:08 | |
| OA-ADMIN(OA.. | ○ | News today: a company notification | ○ | 2008-3-24 (Monday)17:03 | |
| kevintan | ○ | Badminton sport on Tuesday! | ○ | 2008-3-24 (Monday)16:23 | |
| kenbinzhang | ○ | Reconstruction of email tracing accomplished | ○ | 2008-3-24 (Monday)15:48 | |
| harveyzhou | ○ | Fw: Indian mailbox background sub-system | ○ | 2008-3-24 (Monday)14:58 | |
| cocojiang | ○ | GuangYan & headquarter football union, football friendly game... | ○ | 2008-3-24 (Monday)14:41 | |

FIG. 1

| ✉ | ▽ | author △ | ◇ | subject | 🔗 | date |
|---|---|---|---|---|---|---|
| ⊟ cindyzhang | | | | | | |
| ✉ | ▽ | cindyzhang | ○ | Reply: Re: Forward: South Pole activities page art... | ○ | 2008-3-5 (Wednesday) 15:57 |
| ✉ | ▽ | cindyzhang | ○ | Forward: Forward: South Pole activities page art design | ○ | 2008-3-5 (Wednesday) 15:46 |
| ✉ | ▽ | cindyzhang | ○ | Forward: South Pole activities page requirements | ○ | 2008-2-29 (Friday) 18:09 |
| ✉📎 | ▽ | cindyzhang | ○ | Demand of sports star team letter pad (3 pieces) | ○ | 2008-2-28 (Thursday) 19:22 |

FIG. 2

| Sender | Date | Size | Subject |
|---|---|---|---|
| HELPDESK | 2007-10-17 | 1,940 | Re: draft document |
| HELPDESK | 2007-10-16 | 1,827 | Re: meeting on tomorrow afternoon |
| HELPDESK | 2007-10-16 | 2,044 | Re: inquire about case schedule |
| HELPDESK | 2007-09-24 | 1,931 | Draft document |
| HELPDESK | 2007-09-05 | 1,125 | Amendments of draft document |

| | Enoch | Edwards | | | | |
|---|---|---|---|---|---|---|
| | | Enoch Edwards | ◇ | planning tap | | 2006-04-04 |
| | Enoch | Hunter | | | | |
| | | Enoch Hunter | ◇ | meditation vivid | | 2006-04-04 |
| | Ervin Schwartz | | | | | |
| | | Ervin Schwartz | ◇ | Re: Help | | 2006-10-24 |
| | Evelina Griggs | | | | | |
| | | Evelina Griggs | ◇ | pesticide | | 2006-03-11 |
| | Evelyn | | | | | |
| | | Evelyn | ◇ | Enjoy Concerne... | | 2006-08-12 |
| | Evelyn | Bowman | | | | |
| | | Evelyn Bowman | ◇ | Fw: Will Shar... | | 2006-02-20 |
| | Evelyn | Knight | | | | |

FIG. 6

| sender △ | ◇ | subject | 📎 | date |
|---|---|---|---|---|
| cecedai | ○ | Second "QGeQMei" Tencent employee countrywide singer final contest, today... | ○ | 2007-10-29 |
| cecedai | ○ | Tencent sports, platform research and develop system recruiting post | ○ | 2007-10-11 |
| chanche | ○ | Reply: about the problem of complete quit caused by external mailbox telnet command error | ○ | 2007-02-02 |
| chanche | ○ | Reply: Reply: Reply: Reply: problem exists in external mailbox system | ○ | 2006-11-16 |
| chanche | ○ | Reply: Reply: Reply: problem exists in external mailbox system | ○ | 2006-11-15 |
| chanche | ○ | Reply: problem exists in external mailbox system | ○ | 2006-11-13 |
| chanche | ○ | RE: problem exists in external mailbox system | ○ | 2006-11-10 |
| chanche | ○ | Problem exists in external mailbox system | ○ | 2006-11-09 |
| chanche | ○ | RE: please provide program segment for obtaining user password information | ○ | 2006-11-17 |
| chanche | ○ | Reply: submit install package of foxserver with ssl program | ○ | 2006-09-13 |
| chanche | ○ | Reply: intranet information security fixing-related work | ○ | 2006-09-01 |
| chanche | ○ | Reply: intranet information security fixing-related work | ○ | 2006-08-28 |
| chanche | ○ | Reply: intranet information security fixing-related work | ○ | 2006-08-23 |

FIG. 7

| | | | | |
|---|---|---|---|---|
| Colleagues on duty on weekend please monitor uniform storage situation strictly | | | | |
| | ▽ | aogerwang | ∘ Colleagues on duty on weekend please monitor uniform storage situation strictly | ∘ 2007-07-20 |
| | ▽ | aogerwang | ∘ Colleagues on duty on weekend please monitor uniform storage situation strictly | ∘ 2007-07-20 |
| Please note the TIMEWAIT and CLOSEWAIT problems on clients | | | | |
| | ▽ | jeffreymu | ∘ Re:Re:Please note the TIMEWAIT and CLOSEWAIT problems on clients | ∘ 2007-09-10 |
| | ▽ | ZhouHao | ∘ Re:Please note the TIMEWAIT and CLOSEWAIT problems on clients | ∘ 2007-09-10 |
| | ▽ | vincentwen | ∘ Please note the TIMEWAIT and CLOSEWAIT problems on clients | ∘ 2007-09-10 |
| Seek for the intelligent, talent scout's recommendation is welcomed with high reward - wireless, brilliance of technology | | | | |
| | ▽ | besty | ∘ Seek for the intelligent, talent scout's recommendation is welcomed with high reward... | ∘ 2007-10-17 |
| The function of cancelling "reply with history" is invalidated | | | | |
| | ▽ | angusdu | ∘ Re:The function of cancelling "reply with history" is invalidated | ∘ 2007-04-02 |
| | ▽ | lakezeng | ∘ The function of cancelling "reply with history" is invalidated | ∘ 2007-04-02 |

FIG. 8

| | | | | | |
|---|---|---|---|---|---|
| ⊞ | Size: (big, 500KB-1MB) | | | | |
| ⊞ | Size: (large,1-5MB) | | | | |
| ⊟ | Size: (huge, larger than 5MB) | | | | |
| ✉ | ▽ | angu... | ∘ Re: Reply: notification: add a login platform on which statistics are collected by hours... | ∘ 2007-07-20 (Friday)12:32 |
| ✉ | ▽ | angu... | ∘ Re: Reply: notification: add a login platform on which statistics are collected by hours... | ∘ 2007-07-20 (Friday)12:32 |
| ✉ | ▽ | leona... | ∘ Simplified version Beta02 build012 is online! | ∘ 2006-11-21 (Tuesday)19:22 |
| ↓✉🗐 | ▽ | duke... | ∘ Forward: New Yahoo! Homepage - more Ajax and... | ∘ 2006-09-21 (Thursday)15:03 |
| ✉🗐 | ▽ | parco... | ∘ Notice about Zhao Qing Ding lake self-driving tour on January 19 | ∘ 2008-01-14 (Monday)17:30 |
| ✉🗐 | ▽ | cocoj... | ∘ JuZiLiuDing project group want a good name eagerly under the burning sun in summer – 50 | ∘ 2007-06-05 (Tuesday)16:12 |

FIG. 9

| | date: today | | | | |
|---|---|---|---|---|---|
| ✉ | ▽ | GYCM... | ◇ | [Change sheet state of qqmail-080325-1553 has... | ○ 2008-03-25 (Tuesday)15:57 |
| ✉ | ▽ | alexh... | ◇ | [Version submitted for test] FoxMail6.5beta02buil... | ○ 2008-03-25 (Tuesday)15:53 |
| ✉ | ▽ | ericg... | ○ | Virus forecast of the 13th week, 2008 | ○ 2008-03-25 (Tuesday)14:22 |
| ✉ | ▽ | IS-AD... | ○ | Monitor field alarming information daily email (March 24, 2008) | ○ 2008-03-25 (Tuesday)11:24 |
| ✉ | ▽ | johnn... | ○ | Weekly report of QQmail customer complaints (20080324) | ○ 2008-03-25 (Tuesday)10:11 |
| ✉ | ▽ | ivysu... | ○ | Reply: South Pole activities phased summary (March 12 - March 23... | ○ 2008-03-25 (Tuesday)09:53 |
| ✉ | ▽ | jinfan... | ○ | South Pole activities phased summary (March 12 - March 23) | ○ 2008-03-25 (Tuesday)09:46 |
| | date: yesterday | | | | |
| ✉ | ▽ | cindy... | ○ | South Pole activities phased summary (March 12 - March 23) | ○ 2008-03-24 (Monday)20:00 |
| ✉ | ▽ | RD-n... | ○ | Tencent lecture (issue 25) - construct company level... | ○ 2008-03-24 (Monday)17:59 |
| ✉ | ▽ | oa-ad... | ○ | Tencent society news (2008-03-24) | ○ 2008-03-24 (Monday)17:35 |
| ✉ | ▽ | kevin... | ○ | Badminton training on Friday | ○ 2008-03-24 (Monday)17:08 |

FIG. 10

| | joelai | | | | |
|---|---|---|---|---|---|
| ✉ | ▽ | joelai | ○ | Reply: schedule of Trung and Hoi in Shenzhen | ○ 2008-03-21 |
| ✉ | ▽ | joelai | ○ | Reply: Vietnam project regular meeting summary | ○ 2008-03-18 |
| ✉ 📎 | ▽ | joelai | ○ | Forward: SSO plan | ○ 2008-03-06 |
| | Khai.Vuong Quang | | | | |
| ✉ | ▽ | Khai.Vuong Quang | ○ | RE:Tencent:re:Password Transform S... | ○ 2008-02-20 |
| | kinkweng | | | | |
| ✉ | ▽ | kinkweng | ○ | Reply:[zing mail]logo(Internet mail) | ○ 2008-02-29 |
| ✉ | ▽ | kinkweng | ○ | Reply:Tencent:RE:Tencent:RE:magic e... | ○ 2008-02-28 |
| | Lam.Nguyen Ngoc | | | | |
| ✉ 📎 | ▽ | Lam.Nguyen Ngoc | ○ | RE:tencent:issues to be discussed and... | ○ 2008-03-06 |
| ✉ | ▽ | Lam.Nguyen Ngoc | ○ | about marketing plan and market foreca... | ○ 2008-02-26 |

METHOD AND SYSTEM FOR DISPLAYING AND PROCESSING ELECTRONIC FILE LIST

CROSS-REFERENCE TO RELATED APPLICATIONS

This is a continuation of International Application No. PCT/CN2009/071024 filed Mar. 26, 2009, which in turn claims the priority benefit of Chinese Patent Application No. 200810087770.9 filed Mar. 26, 2008, the entire respective disclosures of which are incorporated herein by reference.

FIELD OF THE INVENTION

The present invention relates to electronic file information processing technologies, and more particularly, to a method and system for displaying and processing an electronic file list.

BACKGROUND OF THE INVENTION

The electronic file listing technique is an information displaying technique which displays electronic file brief information of a user in a list. This technique is widely applied in various electronic file information processing systems such as an email system, an electronic file manager, etc.

Take the frequently-used email system as an example. Through an email list, a user may clearly see a general situation of his/her emails at a first glance. Then, the user may select viewing details of one of the emails. The email list generally includes key elements of the emails, also called keywords. The keywords include: sender address information, email subject, whether there is an attachment, sending time of the email, size of the email, unread/read tag, and importance and urgency degree, etc. Some email lists may also include some information or abstract information of email contents. In the email system, the user generally reviews the email list firstly, and then clicks to open an email to view the details of the email.

Figure 1:
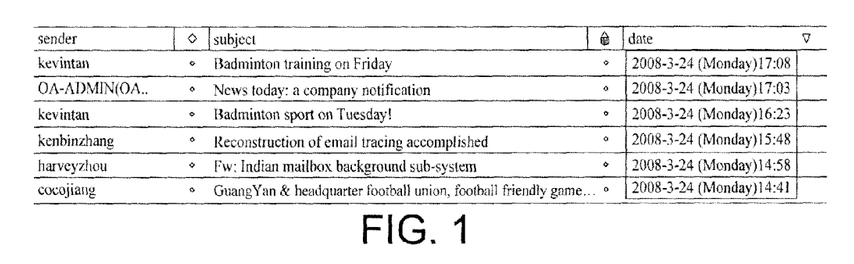
FIG. 1 is a schematic diagram showing an interface of an email list sorted and displayed according to sending time in a reverse order.
Figure 2:
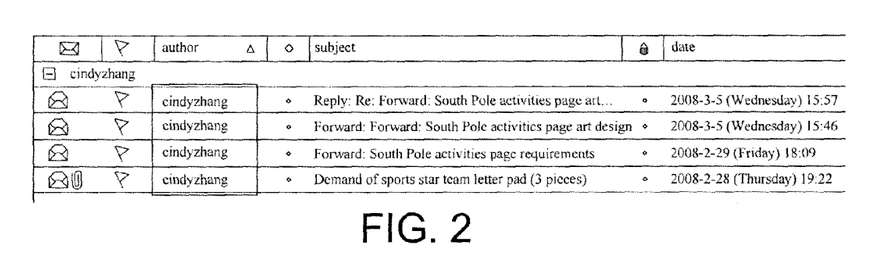
FIG. 2 is a schematic diagram showing an interface of an email list sorted and displayed according to senders in a normal order.

As to the display manner, the electronic file list is usually sorted and displayed according to the keywords in the industry. For example, in the email system, it is possible to sort and display emails according to senders, email subjects, sending time of the emails or size of the emails, etc. For each of the above sorting and displaying manners, a normal order or a reverse order may be adopted. In addition, there are multiple sorting methods such as sorting in alphabetical order, in numerical order, in Chinese strokes order, or in Chinese Pinyin order. Through sorting and displaying based on the keywords, the user may view the emails in a specific manner to find an email required. For example, FIG. 1 is a schematic diagram showing an interface of an email list sorted and displayed according to sending time in the reverse order. As shown in FIG. 1, through sorting the emails by sending time in the reverse order, it is possible to clearly see the latest email. For another example, FIG. 2 is a schematic diagram showing an interface of an email list sorted and displayed according to senders. As shown in FIG. 2, through sorting according to the senders, it is possible to see the emails sent by the same sender.

Figure 3:
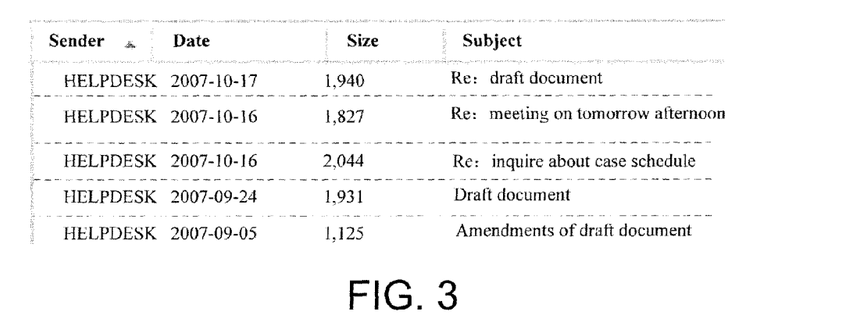
FIG. 3 is a schematic diagram showing an interface where emails are sorted and displayed according to email subjects.

However, in the current displaying method of the electronic file list, when sorting according to a string type keyword (e.g. senders and subjects of emails), the sorting is always performed based on the whole string. It is usually firstly sorted by the first character of the string. However, the string type keyword generally includes some characters irrelevant to its headword, and these irrelevant characters are usually located at the head of the string. For example, in an email subject, characters such as "Reply", "Re" and "Forward" usually appear at the head of the subject. The headword of the subject (i.e. the real subject) is usually behind these irrelevant characters. If the existing sorting method is adopted, the emails which have the same irrelevant characters in the head will be arranged together, whereas they actually do not have the same subject. FIG. 3 is a schematic diagram showing an interface where emails are sorted and displayed according to email subjects. As shown in FIG. 3, since some email subjects begin with "Re", all emails whose email subjects start with "Re" are arranged together. But these emails arranged together do not have relevant subjects actually, while emails actually having relevant subjects are not arranged together. For example, emails with subjects "Re: draft document" and "draft document" are relevant, but are not arranged together, which makes the user unable to accurately find an email he/she actually cares about.

In addition, the current sorting can only be performed according to a single keyword in an alphabetical order or a numerical order. Thus, the user can designate only one keyword and only one sorting direction. For example, sorting may be performed only according to sender address information in a normal alphabetical order or a reverse alphabetical order, or only according to mailing dates in a normal numerical order or in a reverse numerical order. It is not possible to perform combined sorting according to multiple keywords, e.g., firstly according to senders and then sort emails having the same sender according to dates. In addition, current sorting method is generally fixed, e.g. email titles can be sorted in only Chinese Pinyin order but not in a Chinese stroke order. For a user used to using a stroke input method, when searching for an email among a large amount of emails, it may be difficult to find the email although the emails have been sorted because the user is not familiar with the Chinese Pinyin order.

In view of the above, the conventional method for processing and displaying electronic files simply sorts the electronic files merely according to a single keyword without considering other additional sorting related factors. Therefore, the sorting manner is too simplex. When there are a large number of electronic files, adjacent electronic files in the sorted electronic file list have poor relativity, which makes it difficult for the user to accurately find an electronic file that he/she requires.

SUMMARY OF THE INVENTION

Embodiments of the present invention provide a method for displaying and processing an electronic file list, so as to make adjacent electronic files in the electronic file list more related to each other after being processed, and thereby increasing the accuracy for finding an electronic file.

Embodiments of the present invention also provide a system for displaying and processing an electronic file list, so as to make adjacent electronic files in the electronic file list more related to each other after being processed, and thereby increasing the accuracy for finding an electronic file.

According to an embodiment of the present invention, a method for displaying and processing an electronic file list is provided. The method includes:

determining a keyword used for sorting in the electronic file list, the keyword being in a string type;

retrieving keyword information of each electronic files in the electronic file list;

analyzing similarity degrees of the keyword information retrieved, arranging electronic files whose keyword information has a similarity degree higher than or equal to a preset similarity value into one group, performing inter-group sorting and intra-group sorting on the electronic files in each group; and displaying the electronic file list in which electronic files are sorted.

According to another embodiment of the present invention, a system for displaying and processing an electronic file list is provided. The system includes:

a keyword determining unit, adapted to determine a keyword used for sorting, wherein the keyword is in a string type;

a sorting-assistant factor determining unit, adapted to configure a similarity value in advance;

a sorting unit, adapted to retrieve keyword information of each electronic file in the electronic file list according to the keyword determined by the keyword determining unit, analyze similarity degrees of the keyword information retrieved, arrange electronic files whose keyword information has a similarity degree higher than or equal to the similarity value into one group, and perform inter-group sorting and intra-group sorting on the electronic files in each group; and a display unit, adapted to display the electronic file list in which electronic files are sorted.

Compared with the conventional art, embodiments of the present invention do not sort electronic files simple based on a keyword. Instead, the keyword as well as the sorting-assistant factor is determined. The sorting-assistant factor may include the similarity value used for a similarity degree analysis, and may further include other keywords used for combined sorting. Then, the electronic file list is sorted according to the keyword and the sorting-assistant factor determined. As such, the sorting based on the similarity degree or a combination of multiple keywords is realized, which makes the electronic files in the electronic file list more related to each other, and thereby the accuracy for finding an electronic file is increased. It is very convenient for the user to find the electronic file required. Especially when there are a huge number of electronic files, the merits of the present invention may be more obvious. The time and energy of the user for finding the electronic file is dramatically saved.

Embodiments of the present invention may further implement a grouping sorting function, so as to further facilitate the user to find electronic files in a corresponding group and increase the accuracy for finding the electronic file. In addition, embodiments of the present invention provide a special sorting manner selection interface for the user to select the sorting manner, e.g. sorting in an alphabetical order, in a numerical order, in a Chinese stroke order or in a Chinese Pinyin order, etc. Then, according to the user's selection, the sorting is performed according to the user's selection instruction, which further facilitates the user to sort and display the electronic files according to the manner that the user is used to and further saves the time and energy of the user for finding the electronic file.

BRIEF DESCRIPTION OF THE DRAWINGS

FIG. 8 is a schematic diagram showing an interface where emails are sorted by subject information and displayed in groups according to an embodiment of the present invention.

FIG. 9 is a schematic diagram showing an interface where emails are sorted by sizes and displayed in groups according to an embodiment of the present invention.

FIG. 10 is a schematic diagram showing an interface where emails are sorted by time and displayed in groups according to an embodiment of the present invention.

FIG. 11 is a schematic diagram showing an interface where emails are sorted by authors and displayed in groups according to an embodiment of the present invention.

DETAILED DESCRIPTION OF THE INVENTION

The present invention will be described in detail hereinafter with reference to accompanying drawings and embodiments.

Figure 4:
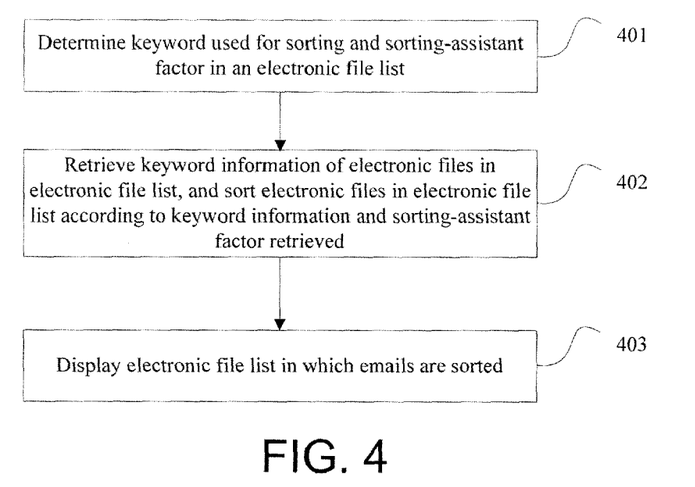
FIG. 4 is a main flowchart of a method for displaying and processing an electronic file list according to an embodiment of the present invention.

FIG. 4 is a main flowchart of a method provided by an embodiment of the present invention. As shown in FIG. 4, the method includes:

Step 401, determine a keyword and a sorting-assistant factor used for sorting in an electronic file list.

Step 402, retrieve keyword information of each electronic file in the electronic file list, and sort electronic files in the electronic file list according to the keyword information and the sorting-assistant factor.

Step 403, display the electronic file list in which electronic files are sorted.

The present invention is applicable to most computer application fields, such as a computer graphics interface operation system, a computer file management system, a computer email system, etc. Hereinafter, the email system is taken as an example for describing the present invention.

In the present invention, the keyword determined in the first step may be a string-type keyword in the electronic file list, e.g. email subject, sender, etc. The sorting-assistant factor may include a similarity degree parameter of the keyword, and may further include other keywords in the email list.

In the embodiment of the present invention, the similarity degree is taken as the sorting-assistant factor. In this situation, in step 401, the keyword used for sorting in the email list is determined and the similarity degree is determined as the sorting-assistant factor. In step 402, keyword information of the emails in the email list are obtained, similarity degrees of the keyword information are analyzed and emails whose keyword information has a similarity degree higher than or equal to a preset similarity value are put into one group. Inter-group sorting and intra-group sorting are performed on each group of emails. In step 403, the sorted email list is displayed.

Through the above three steps, the emails having the same keyword information or similar keyword information are arranged together, which makes adjacent emails in the email list more related to each other. As such, the accuracy for finding a certain email is increased, and it is convenient for the user to find the email required.

Hereinafter, embodiments of the present invention will be described respectively.

First Embodiment

In the first embodiment, the keyword used for sorting is an email subject in the string-type, and the sorting-assistant factor includes a similarity degree parameter of the keyword. The similarity degree parameter may be pre-configured in the system and is adjustable.

For different keywords, corresponding degree parameters may be different. As to the sorting based on the email subject in this embodiment of the present invention, the corresponding similarity degree parameter may include interference character information which should be removed, a similarity value, etc.

Instead of directly analyzing the similarity degrees of the email subjects, the present invention firstly obtains a headword from each email subject by an accidence or syntax analyzing rule, and then analyzes the similarity degrees of headwords obtained, puts the emails whose headwords have a similarity degree higher than or equal to the preset similarity value into one group. Then the sorting and displaying operations are performed. Thus, the emails having similar headwords in their subjects are arranged together.

The headword is a main part in the keyword information for expressing key information. Therefore, unnecessary interference information may be removed by an accidence or syntax analysis, and the key information may be remained. Through analyzing the headwords, the accuracy for analyzing the similarity degrees may be increased. In addition, the headword has fewer characters after the inference information is removed. Through analyzing the similarity degree of fewer characters, the analyzing process is simplified.

In the embodiment of the present invention, the sorting of emails according to the email subjects specifically includes the following steps:

Step 11, firstly retrieve each email subject from each email.

Step 12, retrieve a headword from each email subject according to the similarity degree parameter. One type of detailed implementation for retrieving the headword is as follows:

Firstly, through performing an accidence or syntax analysis on each email subject, interference characters configured in the similarity degree parameter are found in the email subject, and the found interference characters are removed from the email subject. And the left string in the email subject is taken as the headword, i.e. the real subject.

As to the email subject, there are many interference characters. The interference characters include prefix interference characters automatically added by the system for identifying email operation information, e.g. "Forward", "Reply", "Re", etc. In the similarity degree parameter, the characters "Reply", "Re" and "Forward" may be preconfigured as the prefix interference characters. If the email subject retrieved includes, especially in the head of the email subject, such prefix interference characters, the prefix interference characters should be removed.

The prefix interference characters are a basic kind of interference characters. According to scenarios where the email system is applied and according to different professions of users, the interference characters may also include those usually used by senders, e.g. "please deal with", "please be noted", "please be acknowledged", etc. Such information does not contain actual contents, belongs to user self-defined interference characters and is configured by the users. As such, in the similarity degree parameter, the self-defined interference characters may be configured in advance. If the email subject retrieved contains such self-defined interference characters, the self-defined interference characters should be removed.

In addition, the system will ignore some special symbols, such as 【 】( ), and characters included in the symbols, according to experience values. Thus, interference caused by non-keywords is avoided. Therefore, step 12 preferably further includes: searching each email subject for a pre-defined type of parentheses, removing the parentheses and characters included in the parentheses from the email subject, and taking the remaining string in the email subject as the headword. For example, as to two emails with respective subjects of "(ID 1891) test project" and "(ID 1892) test project", after removing the interference information, the system will regard the headword of the two emails as "test project".

In practical applications, the above step of removing the interference characters and the step of removing the parentheses and information included in the parentheses may be used simultaneously or alternatively.

When the headword is retrieved, it is possible to retrieve the headword according to a pre-configured headword retrieving parameter, or to take the remaining string after removing the interference characters from the email subject as the headword of the subject information. In another embodiment of the present invention, it is also possible to retrieve the headword directly from the subject information.

Step 13, analyze the similarity degrees of the headwords of the email subjects in the email list. The headwords are sorted according to the similarity degrees, so that the emails in the email list are sorted. The higher the similarity degree, the closer the headwords are arranged.

In particular, the similarity degree parameter in this embodiment includes a similarity value which denotes a similarity degree. It may be represented by a percentage, specifically, by a percentage of the common contents between different keyword information or between different headwords in the whole contents. The similarity value may be configured by the user. For example, similarity values respectively corresponding to high, medium and low similarity degrees may be configured. For example, as to the high similarity degree, the similarity value may be set as, e.g., 90%. When analyzing the similarity degrees, the system analyzes the headwords of the email subjects by an analysis algorithm to calculate the similarity degrees of the headwords, and then regards the subjects which have 90% of common contents as the same subjects.

In step 13, analyze the similarity degrees of the headwords of the email subjects in the email list, put the emails whose headwords have a similarity degree higher than or equal to the similarity value into one group, and perform inter-group sorting and intra-group sorting for each group of emails.

The headword of a piece of subject information may express one or more pieces of content information with different significances. For example, a project number or case number expressed by a numeral-type or a English-letter-type string is relatively important, whereas some frequently used terms such as "please be noted" and "thanks" are less important. In order to make the headwords containing important information have a higher similarity degree, some high-weight information which is regarded as more important is configured in advance. When analyzing the similarity degree, it is detected whether the common contents of the headwords contain the high-weight information. If the high-weight information is detected, the proportion of the high-weight information in the similarity degree is increased. The proportion may be increased by multiplying with a weight.

For example, there are three subjects as follows:

Subject 1: "number 189384 applies for test data, please change";

Subject 2: "number 189384 applies for test data, please process"; and

Subject 3: "number 189393 applies for test data, please change".

If the above three subjects are simply compared with each other, it can be obtained that subject 1 and subject 2 have a similarity degree of $16/18$, and subject 1 and subject 3 also have a similarity degree of $16/18$. If the numeral-type character is configured as high-weight information with a weight of 2, and the frequently used term "please change" is configured as low-weight information with a weight of 0.5, the similarity degree between subject 1 and subject 2 will be increased. It can be seen from the above that, the configuration of the weight makes the calculated similarity degree more accurate and meets the user's requirement better.

Similarly, it is also possible to configure some low-weight information which is regarded as less important, e.g. commonly used terms containing unimportant information. When the similarity degree is analyzed, if it is detected that the common contents of multiple headwords contain the same low-weight information, the proportion of the low-weight information in the similarity degree is decreased. The high-weight information and the low-weight information may be used simultaneously or alternatively.

In addition, an analysis on a relationship between a sender and a receiver may be added in the analysis of the similarity degree. If the sender and the receiver have emails come-and-go and the interval of the emails does not exceed a certain limit, these emails may be regarded as emails having a high similarity degree. Thus, the emails are arranged in the same group. Therefore, the interference caused by some long-ago emails with the same subject may be avoided.

As to the intra-group sorting, various sorting methods, e.g. sorting in alphabetical order, in Pinyin order, in Chinese stroke order, etc., may be adopted to sort the subjects or the subject headwords. As to the inter-group sorting, the sorting based on time is adopted as a default sorting method.

Step 14, display the sorted email list.

Figure 5:
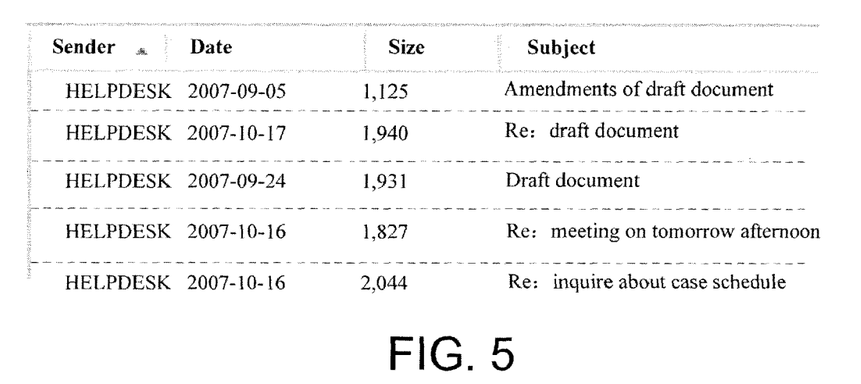
FIG. 5 is a schematic diagram showing an interface of an email list in which emails are sorted by their subject information according to an embodiment of the present invention.

FIG. 5 is a schematic diagram illustrating an interface of an email list in which the emails are sorted by subject information according to an embodiment of the present invention. As shown in FIG. 5, the affect of the interference character "Re" may be removed by the above processing method. As such, the three emails related to "document draft" are arranged together, which enhances the correlation between adjacent emails. The user is able to find all emails related to "document draft" conveniently. FIG. 5 only shows a simple example. When there are a large number of emails, the merits of the present invention may be more explicit.

Second Embodiment

In the second embodiment, the keyword used for sorting is the author of each email in string type, i.e. the sender of each email. As to the sorting based on the senders of the emails in this embodiment, the corresponding similarity degree parameter may include: language classification information, address classification information and a similarity value.

The sorting based on the senders in the embodiment of the present invention specifically includes the following steps:

Step 21, retrieve complete information of the sender of each email, including an email address and a name of the sender.

Step 22, compare the similarity degrees of the complete information of senders according to the similarity degree parameter, and sort the senders according to their similarity degrees.

Step 22 includes: firstly classifying the senders according to different languages of their names, e.g., the senders with names in simplified Chinese characters are put in one category, senders with names in the original complex form of the simplified Chinese characters are put in one category, senders with names in English are put in one category, and those with names in French are put in one category. Or, Step 22 includes: classifying the senders according to areas where their email addresses belong. Thus, emails from senders in the same area will be preferentially arranged together. Then, in subsequent display, email groups in the same language will be displayed in adjacency, which avoids confused arrangement of different languages.

Then, with respect to the senders corresponding to each type of language, the similarity degrees of the complete information of the senders are analyzed, and senders are sorted according to the similarity degrees. The higher the similarity degree, the closer the senders are arranged.

In particular, there are two manners for implementing the step of analyzing the similarity degrees of the complete information of the senders in each category and sorting the senders according to the similarity degrees.

In the first manner, the similarity degrees of the complete information of the senders retrieved are analyzed directly, the emails whose senders' complete information has a similarity degree higher than or equal to the preset similarity value are put in one group, and inter-group and intra-group sorting are performed on each group. Since the email address occupies a large portion in the complete information, if only the similarity value is configured appropriately, the emails whose senders have the same email address will be arranged in one group. But this manner does not have high accuracy, and a preferred implementation manner is the second manner as follows.

In the second manner, a similarity analysis is performed on the names of the senders, and the emails whose senders have the same name are arranged in one group. Meanwhile, the email addresses are also taken into consideration when the emails are grouped. In particular, the second manner includes the following steps:

a, according to a pre-defined name splitting rule, split the name of a sender into a family name and a first name. As to the sorting by the names of the senders, it generally requires a high similarity degree, e.g. the similarity value is generally 100%.

As to a Chinese name, the name splitting rule includes: splitting the name according to the length of the name and pre-learned family names. For example, if the length of the name is larger than or equal to 4, the first two characters are the family name. If the length of the name is smaller than 4, the first character is the family name. Thus, compound family names may be differentiated from the single-character family names. For example, people with family name Ou and those with family name Ou-yang will be arranged in two categories. As to names in foreign languages, the name splitting rule includes: splitting the name according to the space in the name of the sender.

b, analyze similarity degrees of the family names of the senders, arrange the names with the same family name in one category. The similarity degrees of the first names of the senders in each category are analyzed, and the names having the same first name are put in one group. Thus, one category is divided into one or more groups. Then, the emails in each group are sorted by time, the groups in each category are sorted by the first names, and the categories are sorted by the family names.

Or, in step b, it is also possible to put the names with the same first name in one category, and arrange the names with the same family name in each category in one group. The emails in each group are sorted by time, the groups in each category are sorted by the family names, and the categories are sorted by the first names.

In the above sorting based on the family names or the first names, any of the Pinyin order, the alphabetical order and the stoke order may be adopted. The user may flexibly select one of sorting orders according to practical requirements.

Preferably, during the classification and sorting of the emails according to the splitting results of names, it is further possible to put the emails corresponding to the senders using the same email address into one group according to the addresses of the senders. For example, the email addresses of sender Li Ping and Li Liping are both apple@sina.com. It can be seen that Li Ping and Li Liping are the same sender. Therefore, the emails corresponding to Li Ping and Li Liping are put in the same group.

Step 24, display the email list in which emails are sorted.

Figure 6:
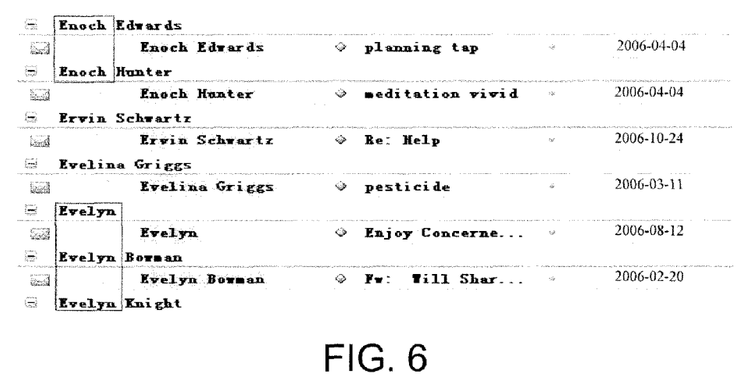
FIG. 6 is a schematic diagram showing an interface of an email list in which emails are sorted by senders according to an embodiment of the present invention.

FIG. 6 is a schematic diagram showing an interface of an email list in which emails are sorted by senders according to an embodiment of the present invention. As shown in FIG. 6, since the senders are all in English, they are grouped together. And since "Enoch Edwards" and "Enoch Hunter" have the same first name "Enoch", they belong to the same category and the emails of the two senders are arranged together. "Evelyn", "Evelyn Bowman" and "Evelyn Knight" have the same first name "Evelyn", and therefore they belong to another category and emails of these three senders are arranged together. As to the categories where "Enoch" and "Evelyn" respectively belongs, the sorting is performed according to the first names "Enoch" and "Evelyn" in an alphabetical order. As shown in FIG. 6, the category which "Enoch" belongs to is sorted in the front. As to the groups in each category, the sorting is performed according to the family names in alphabetical order. As shown in FIG. 6, the group which "Enoch Edwards" belongs to in the category "Enoch" is sorted in the front.

The language classification operation in this embodiment is also applicable to the embodiments in which the emails are sorted according to email subjects. Then during the display in step 14, the email groups using the same language will be displayed in adjacency. For example, if the sorted email list includes Chinese subjects and English subjects, the emails with Chinese subjects are arranged together, and those with English subjects are arranged together. Thus, confusion arrangement of emails in different languages is avoided.

Third Embodiment

In the third embodiment, the keyword used for sorting may be any type of keyword of the email, e.g. subject, sender, sending time, size, etc., referred to as a first keyword. The sorting-assistant factor may also include a keyword of the email, and may include one or more keywords, respectively referred to as second keyword, third keyword, and so on. The terms "first", "second" used herein are just for differentiating the keywords but not for indicating sequences of their locations in the email list.

The first keyword is used for grouping. The emails with similar first keywords are arranged in the same group. The second keyword is used for inter-group sorting. The third keyword is used for intra-group sorting. If the emails need to be sorted more detailedly, more keywords may be configured.

Hereinafter, an exemplary sorting-assistant factor is supposed to be one keyword in the email. Suppose the first keyword is sender and the second keyword is sending time. The first and second keywords may be pre-configured in the system. Or, the system configures a default first keyword and determines the second keyword according to a user's selection. The detailed sorting procedure includes:

Step 31, retrieve sender information from each email.

Step 32, sort the emails in the email list according to the sender information. Herein, various sorting manners, e.g. sorting in an alphabetical order, in a Chinese Pinyin order, in a Chinese stroke order, etc., may be adopted to sort the sender information. Certainly, it is also possible to calculate similarity degrees of the senders and sort the senders according to the similarity degrees as described in the second embodiment.

Step 33, retrieve time information from each email.

Step 34, sort the groups of emails which have different sender information according to the time information retrieved. When sorting the groups, the time information of the latest email in each group is taken as a reference. Thus, it is realized to sort the emails of different senders according to time.

As to the intra-group sorting of the emails in each group, the sorting may still be performed based on time.

Figure 7:
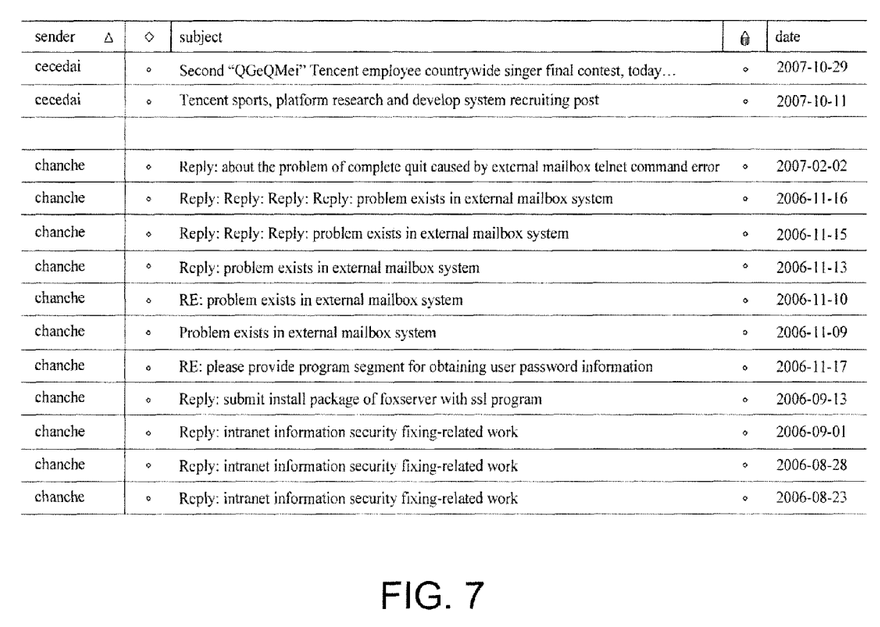
FIG. 7 is a schematic diagram showing an interface where emails are sorted according to both senders and dates according to an embodiment of the present invention.

FIG. 7 is a schematic diagram showing an interface where the sorting is based on a combination of senders and time. As shown in FIG. 7, the emails are first classified into groups according to senders, the groups are sorted according to time of a latest email in each group, and the emails in each group are sorted according to their time, so that a combined sorting based on multiple keywords is implemented. As shown in FIG. 7, a latest email of sender cecedai is on Oct. 29, 2007 (the specific time is omitted), a latest email of sender chanche is on Feb. 2, 2007 (the specific time is omitted). Therefore, the email sent by sender cecedai is sorted in front of the email sent by chanche.

If the sorting-assistant factor further includes the third keyword, the emails having the same information with respect to the above two keywords should be sorted again according to the third keyword on basis of the above sorted result. If the sorting-assistant factor includes even more keywords, the operations may be deduced by analogy. As such, the combined sorting based on multiple keywords is implemented.

Based on the above first, second and third embodiments, a grouping display function may be further implemented. That is, after the sorting according to a designated keyword, the sorted result is displayed in groups of lists, so that the email list is more definite and clearer and the user can find an email more rapidly and easily.

The grouping operations in this embodiment of the present invention may adopt a group index and original data separating method. Firstly, email data are classified into multiple groups according to similarity degrees. Then, main information of each group, the number of emails in each group, email information included in each group is written into a group index. The main information is the keyword used for grouping. For example, if the emails are grouped according to senders, the main information is the sender of the emails in the group. If the emails are grouped according to subjects, the main information is the subject headword of the emails in the group. If the emails are grouped according to time, the main information is a date range (e.g. today, yesterday, etc.). If the emails are grouped according to the size, the main information is a size range of the group. Afterwards, the group indexes are sorted according to, for example, the main information or the time of the latest email. The sorting of the group indexes realizes the inter-group sorting. After the sorting is completed, an email group corresponding to each group index is obtained from original data according to the group index information, and the emails of each group is outputted to an interface according to the order of the group indexes.

FIG. 8 is a schematic diagram showing an interface where emails are sorted by subject information and displayed in groups according to an embodiment of the present invention. As shown in FIG. 8, as to subject information of the emails, the subject information of each email is retrieved according to the method described in the first embodiment. The headword of the subject information is analyzed, and prefixes other than the headword, e.g. "Re", "Reply" and "Forward", are removed. The subjects are compared and their similarity degrees are obtained by taking the headword as a center. The emails having the most similar subjects are put into one group according to the similarity degrees. As shown in FIG. 8, the emails having the same real subject are put into one group. Thus, the user may find similar emails conveniently. In addition, as to the keyword of a subject, information included in some special symbols such as 【 】( ) may be ignored by the system based on experience values. For example, as to a bill, it is generally use (Mar. 1, 2007) bill as the subject. As such, the user cannot find all the bills at one time. In the embodiments of the present invention, after the time in the parentheses ( ) is ignored, all the bank bills will be classified in one group.

FIG. 9 is a schematic diagram showing an interface where emails are sorted by sizes and displayed in groups according to an embodiment of the present invention. As show in FIG. 9, the system firstly obtains sizes of all emails, then puts emails in accord with the same rule into one group according to rules pre-defined by the system, and displays the emails in a folded manner to the user.

FIG. 10 is a schematic diagram showing an interface where emails are sorted by time and displayed in groups according to an embodiment of the present invention. As shown in FIG. 10, the system obtains time of all emails, puts emails in accord with the same rule to a corresponding group according to rules such as today, yesterday, this week, last week defined by the system, and displays the emails in the folded manner to the user.

FIG. 11 is a schematic diagram showing an interface where emails are sorted by authors and displayed in groups according to an embodiment of the present invention. As shown in FIG. 11, the system firstly analyzes author information of the emails, arranges the emails of the same author in one group, and sorts the emails in each group according to time.

In addition, embodiments of the present invention are able to provide two or more sorting manners for users' selection. The available sorting manners include: sorting in a similarity order, in a numerical order, in an alphabetical order, in a Chinese Pinyin order, in a Chinese stroke order, etc. The system may sort an electronic file list by a corresponding sorting manner according to a selection instruction inputted by the user.

Figure 12:
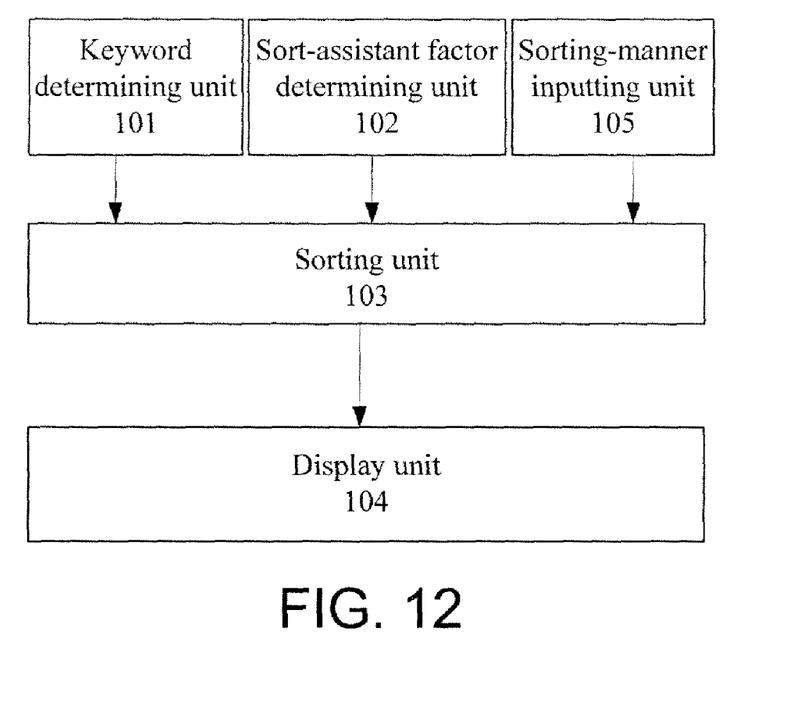
FIG. 12 is a schematic diagram illustrating a structure of a system for displaying and processing an electronic file list according to an embodiment of the present invention.

Embodiments of the present invention also provide a system for displaying and processing an electronic file list. FIG. 12 is a schematic diagram illustrating a structure of a system for displaying and processing an electronic file list according to an embodiment of the present invention. As shown in FIG. 12, the system includes:

a keyword determining unit 101, adapted to determine a keyword used for sorting in an electronic file list, wherein the keyword is in a string type;

a sorting-assistant factor determining unit 102, adapted to configure a similarity value as a sorting-assistant factor in advance;

a sorting unit 103, adapted to retrieve keyword information from electronic files in the electronic file list according to the keyword determined by the keyword determining unit 101, analyze similarity degrees of the keyword information retrieved, arrange the electronic files whose keyword information has a similarity degree higher than or equal to the similarity value configured by the sorting-assistant factor determining unit 102 into one group, perform inter-group sorting and intra-group sorting on the electronic files in each group. Preferably, the inter-group sorting is performed based on a second keyword selected by a user;

a display unit 104, adapted to display the electronic file list in which electronic files are sorted. Preferably, the display unit 104 is adapted to display the electronic files in the same language in adjacency.

The system may further include a sorting-manner input unit 105, adapted to provide two or more sorting manners for the user's selection, e.g. sorting in a similarity degree order provided by the embodiments of the present invention, or sorting in a numerical order, an alphabetical order, a Chinese Pinyin order or a Chinese stroke order; and adapted to trigger, according to a selection instruction inputted by the user, the sorting unit 103 to sort the electronic files in the electronic file list according to a corresponding sorting manner.

If the keyword determined by the keyword determining unit 101 for sorting is a string type keyword except the author of the electronic file, e.g. the subject of the electronic file, the sorting unit 103 specifically includes a grouping module and a sorting module.

The grouping module is adapted to retrieve the keyword information of the electronic files in the electronic file list according to the keyword determined by the keyword determining unit, retrieve headwords from the keyword information of the electronic files through syntax or accidence analysis, analyze similarity degrees of the headwords, and put the electronic files whose headwords have a similarity degree higher than or equal to the configured similarity value into one group, and then transmit the grouping result to the sorting module.

The sorting module is adapted to perform inter-group sorting and intra-group sorting on the electronic files in each group according to the grouping result received. The inter-group sorting may be based on a second keyword selected by the user or based on a headword of each group. If the inter-group sorting is based on the headword of each group, the sorting manner in an alphabetical order or a stroke order may be used. The intra-group sorting may be based on a third keyword, usually time in default, selected by the user.

The grouping module specifically includes a keyword retrieving sub-module, a headword retrieving sub-module and a similarity degree analyzing sub-module.

The keyword retrieving sub-module is adapted to retrieve the keyword information of the electronic files in the electronic file list according to the keyword determined by the keyword determining unit 101, and transmit the keyword information retrieved to the headword retrieving sub-module.

The headword retrieving sub-module is adapted to search for pre-configured self-defined interference characters and/or prefix interference characters in the keyword information retrieved, remove the found self-defined interference characters and/or prefix interference characters from the keyword information. The pre-configured self-defined interference characters and prefix interference characters are stored by the sorting-assistant factor determining unit 102.

The headword retrieving sub-module is further adapted to search for parentheses in a pre-configured type in the keyword information, delete the parentheses and characters included in the parentheses from the keyword information. The parentheses in the pre-configured type are stored by the sorting-assistant factor determining unit 102.

The function of removing interference characters and the function of removing parentheses of the headword retrieving sub-module may be used simultaneously or alternatively. After the interference characters and/or the parentheses and information included in the parentheses are removed, the remaining characters of the keyword information are taken as a headword.

The similarity degree analyzing sub-module is adapted to analyze similarity degrees of headwords retrieved by the headword retrieving sub-module, detect, while analyzing, whether the headwords include high-weight information and/or low-weight information pre-configured by the sorting-assistant factor determining unit 102, increase a proportion of the high-weight information in the similarity degree if the common contents of multiple headwords include the high-weight information, decrease a proportion of the low-weight information in the similarity degree if the common contents of multiple headwords include the low-weight information. The pre-configured high-weight information and the low-weight information are stored by the sorting-assistant factor determining unit 102.

If the keyword determined by the keyword determining unit 101 for sorting is the author of the electronic file, the sorting unit 103 still includes the grouping module and the sorting module.

The sorting module functions similarly to the sorting module described above, and is adapted to perform inter-group sorting and intra-group sorting on the electronic files in each group according to the grouping result received.

The structure and functions of the grouping module may be different in different embodiments.

One of the embodiments is as follows: the grouping module specifically includes a keyword retrieving sub-module and a similarity degree analyzing sub-module.

The keyword retrieving sub-module is adapted to retrieve complete information of an author of each electronic file in the electronic file list, and send the complete information retrieved to the similarity degree analyzing sub-module; wherein the complete information includes an email address and the name of the author.

The similarity degree analyzing sub-module is adapted to analyze similarity degrees of the complete information of authors of the electronic files, put the electronic files whose authors' complete information has a similarity degree higher than or equal to a preset similarity value into one group.

In another embodiment, the grouping module specifically includes a keyword retrieving sub-module and a similarity analyzing sub-module, and further includes a headword retrieving sub-module.

The keyword retrieving sub-module is adapted to retrieve the name of the author of each electronic file in the electronic file list and send the name retrieved to the headword retrieving sub-module.

The headword retrieving sub-module is adapted to split, according to a pre-defined name splitting rule, the name into a family name and a first name, respectively configure the family name and the first name as first name information and second name information, and send the split result to the similarity degree analyzing sub-module. If the first name information is the family name, the second name information is the first name. If the first name information is the first name, the second name information is the family name.

The similarity degree analyzing sub-module is adapted to put the electronic files whose authors have the same first name information into one category, and put the electronic files in the same category whose authors have the same second name information into one group. During the similarity degree analyzing procedure, the electronic files whose authors are different but email addresses are the same are further put into one group.

In addition, embodiments of the present invention provide a special sorting manner selection interface for the user to select the sorting manner, e.g. sorting in an alphabetical order, in a numerical order, in a Chinese stroke order or in a Chinese Pinyin order, etc.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method for displaying and processing an electronic file list, comprising computer-implemented steps of:
   determining a keyword used for sorting in the electronic file list, the keyword being in a string type;
   retrieving keyword information of each electronic file in the electronic file list;
   analyzing similarity degrees of the keyword information retrieved, arranging electronic files whose keyword information has a similarity degree higher than or equal to a preset similarity value into one group, performing inter-group sorting and intra-group sorting on the electronic files in each group; and
   displaying the electronic file list in which electronic files are sorted
   wherein analyzing the similarity degrees of the keyword information and arranging the electronic files whose keyword information has the similarity degree higher than or equal to the preset similarity value into one group comprises,
   retrieving headwords from the keyword information through a syntax or accidence analysis, and
   analyzing similarity degrees of the headwords retrieved, and arranging the electronic files whose headwords have a similarity degree higher than or equal to the preset similarity value into one group.

2. The method of claim 1, wherein retrieving the headwords from the keyword information through the syntax or accidence analysis comprises:
   searching for self-defined interference characters in the keyword information retrieved, and removing the found self-defined interference characters from the keyword information.

3. The method of claim 1, wherein retrieving the headwords from the keyword information through the syntax or accidence analysis comprises:
   searching for parentheses of a pre-defined type in the keyword information retrieved, and removing the parentheses and characters included in the parentheses from the keyword information.

4. The method of claim 1, wherein analyzing the similarity degrees of the headwords comprises:
   detecting whether the headwords comprise at least one of pre-defined high-weight information and pre-defined low-weight information; if common contents of multiple headwords comprise the high-weight information, increasing a proportion of the high-weight information in a similarity degree of the multiple headwords; if the common contents of the multiple headwords comprise the low-weight information, decreasing a proportion of the low-weight information in the similarity degree of the multiple headwords.

5. The method of claim 1, wherein the keyword used for sorting is an author of each electronic file;
  wherein retrieving the keyword information of each electronic file in the electronic file list comprises retrieving complete information of the author of each electronic file in the electronic file list, wherein the complete information comprises an email address and a name of the author of each electronic file; and
  wherein the analyzing the similarity degrees of the keyword information and arranging the electronic files whose keyword information has the similarity degree higher than or equal to the preset similarity value into one group comprises analyzing the similarity degrees of complete information of authors of electronic files, arranging the electronic files whose authors' complete information has a similarity degree higher than or equal to the preset similarity value into one group.

6. The method of claim 1, wherein the keyword used for sorting is an author of each electronic file; and the keyword information retrieved from each electronic file in the electronic file list is a name of the author of each electronic file in the electronic file list; and
  wherein analyzing the similarity degrees of the keyword information and arranging the electronic files whose keyword information has the similarity degree higher than or equal to the preset similarity value comprises:
    splitting the name of the author of each electronic file into a family name and a first name according to a preset name splitting rule, configuring the family name and the first name as first name information and second name information;
    analyzing the similarity degrees of the first name information of the electronic files in the electronic file list, putting the electronic files corresponding to the authors having the same first name information into one category; and
    analyzing the similarity degrees of the second name information of the electronic files in each category, putting the electronic files corresponding to the authors having the same second name information into one group.

7. The method of claim 6, wherein analyzing the similarity degrees of the keyword information retrieved and arranging the electronic files whose keyword information has the similarity degree higher than or equal to the preset similarity value into one group further comprises:
  putting the electronic files corresponding to different authors using a same email address into one group.

8. The method of claim 1, wherein the inter-group sorting is based on a second keyword selected by a user.

9. The method of claim 8, wherein the second keyword is time, and the inter-group sorting comprises: performing the inter-group sorting according to the time of a latest electronic file in each group.

10. The method of claim 1, wherein displaying the electronic file list in which electronic files are sorted comprises: displaying electronic file groups using a same language in adjacency.

11. A computer-implemented system for displaying and processing an electronic file list, wherein the computer-implemented system comprises one or more processors coupled to a memory storing instructions, for executing by the one or more processors, wherein the instructions comprise:
  a keyword determining instruction, which indicates to determine a keyword used for sorting, wherein the keyword is in a string type;
  a sorting-assistant factor determining instruction, which indicates to configure a similarity value in advance;
  a sorting instruction, which indicates to retrieve keyword information of each electronic file in the electronic file list according to the keyword determined according to the keyword determining instruction, to analyze similarity degrees of the keyword information retrieved, to arrange electronic files whose keyword information has a similarity degree higher than or equal to the similarity value into one group, and to perform inter-group sorting and intra-group sorting on the electronic files in each group; and
  a display instruction, which indicates to display the electronic file list in which electronic files are sorted
  wherein the sorting instruction comprises a grouping instruction, adapted to (i) retrieve the keyword information of each electronic file in the electronic file list according to the keyword determined according to the keyword determining instruction, (ii) retrieve headwords from the keyword information through a syntax or accidence analysis, (iii) analyze similarity degrees of the headwords, and (iv) put electronic files whose headwords have a similarity degree higher than or equal to the similarity value into one group.

12. The system of claim 11, wherein the sorting-assistant factor determining instruction is further adapted to store a self-defined interference character;
  the grouping instruction comprises a headword retrieving sub-instruction, adapted to search for the self-defined interference character in the keyword information retrieved, and to remove the self-defined interference character from the keyword information.

13. The system of claim 11, wherein the sorting-assistant factor determining instruction is further adapted to store parentheses of a pre-defined type; and
  the grouping instruction comprises a headword retrieving sub-instruction, adapted to search for the parentheses in the keyword information retrieved, and to remove the parentheses and characters included in the parentheses from the keyword information.

14. The system of claim 11, wherein the sorting-assistant factor determining instruction is further adapted to store preset high-weight information and/or low-weight information; and
  the grouping instruction comprises a similarity degree analyzing sub-instruction, adapted to analyze the similarity degrees of the headwords retrieved, to detect whether the headwords comprise at least one of the high-weight information and the low-weight information, to increase, if common contents of multiple headwords comprise the high-weight information, a proportion of the high-weight information in a similarity degree of the multiple headwords, to decrease a proportion of the low-weight information in the similarity degree of the multiple headwords if the common contents of the multiple headwords comprise the low-weight information, and to put the electronic files whose headwords have a similarity degree higher than or equal to the similarity value determined according to the sorting-assistant factor determining instruction into one group.

15. The system of claim 11, wherein the keyword determined according to the keyword determining instruction for sorting is an author of each electronic file; and the grouping instruction comprises a keyword retrieving sub-instruction adapted to retrieve complete information of the author of each electronic file in the electronic file list, wherein the complete information comprises an email address and a name of the author of the electronic file.

16. The system of claim 11, wherein the keyword determined according to the keyword determining instruction for sorting is an author of each electronic file;

the sorting instruction further comprises a sorting sub-instruction;

the grouping instruction comprises a keyword retrieving sub-instruction, a headword retrieving sub-instruction and a similarity degree analyzing sub-; wherein the keyword retrieving sub-instruction is adapted to retrieve a name of the author of each electronic file in the electronic file list, and to send the name retrieved to the headword retrieving sub-instruction;

the headword retrieving sub-instruction is adapted to split the name retrieved into a family name and a first name according to a preset name splitting rule, to configure the family name and the first name as first name information and second name information, and to send a name split result to the similarity degree analyzing sub-instruction; and the similarity degree analyzing sub-module is adapted to put electronic files corresponding to authors having same first name information into one category, and to put the electronic files in each category corresponding to the authors having same second name information into one group.

17. The system of claim 16, wherein the similarity degree analyzing sub-instruction is further adapted to put the electronic files corresponding to different authors using a same email address into one group.

18. The system of claim 11, wherein the sorting instruction is adapted to perform the inter-group sorting according to a second keyword selected by a user.

* * * * *